Sept. 30, 1941.                A. G. DAVIS                2,257,334
                                 GASKET
                     Original Filed Dec. 31, 1940
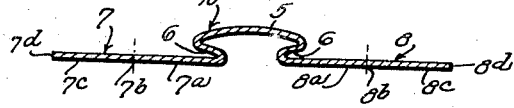
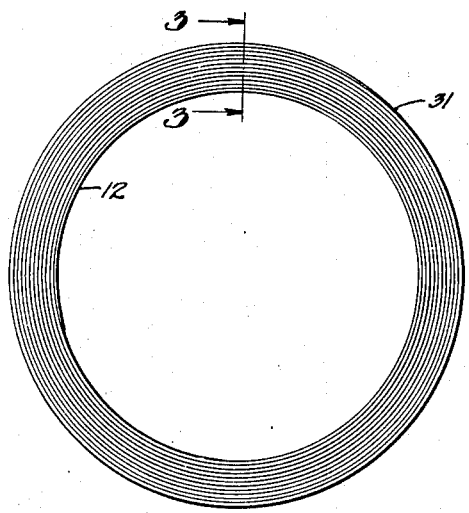
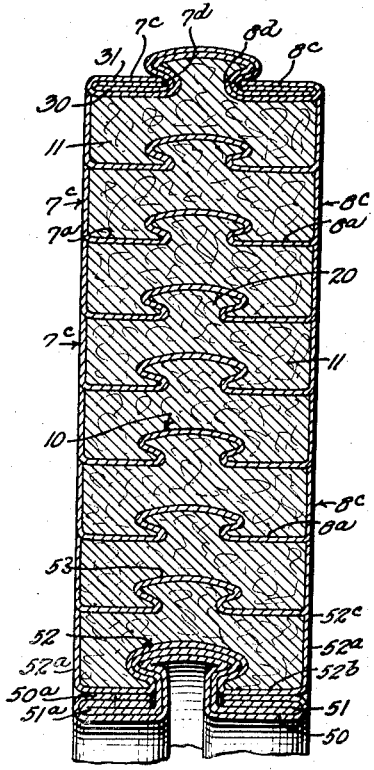
Inventor
ARTHUR G. DAVIS
By Joseph Roseman
                                                   Attorney Patented Sept. 30, 1941

2,257,334

UNITED STATES PATENT OFFICE 2,257,334

GASKET

Arthur G. Davis, South Merchantville, N. J., assignor to United States Gasket Company, a corporation of New Jersey Original application December 31, 1940, Serial No. 372,645, now Patent No. 2,244,640, dated June 3, 1941. Divided and this application May 17, 1941, Serial No. 394,019

4 Claims. (Cl. 288—27)

This invention relates to gaskets. More particularly, the invention relates to a gasket construction made of a coiled metal strip having a specially formed cross-sectional contour and having non-metallic packing interposed between the convolutions of the metal strip.

This application is a division of application Serial No. 372,645, filed December 31, 1940, now Patent No. 2,244,640, issued June 3, 1941.

The invention will be more fully understood from the following specification and accompanying drawing, wherein Figure 1 is a cross-sectional view of the metal strip used in making the gasket.

Figure 2 is a plan view of one of the flat lateral faces of the completed gasket, and Figure 3 is a sectional view taken on a line 3—3 of Figure 2.

Referring more particularly to the drawing, Figure 2 illustrates an edge view of the completed gasket formed of a spirally wound or coiled metal strip 10 and asbestos strip or other suitable non-metallic packing 11 interposed between the metal coils, except that no packing is interposed between the three innermost windings 50, 51 and 52 and the last two outermost windings 30 and 31, for a purpose to be explained. The metal strip 10 utilized for making the gasket is preferably made of steel and has the initial contour shown in Figure 1. The strip is provided with a medially positioned continuous longitudinally extending bead portion 5, which is somewhat mushroom-shaped in cross-section, and reentrant longitudinally extending continuous pocket portions 6 at the base of the bead portion on each side thereof, and flat marginal flange portions 7 and 8 extending laterally on each side of the bead portion.

In forming the gasket, a metal strip 10 of suitable length is secured and wound on a mandrel of suitable diameter so that two full convolutions designated by numerals 50 and 51 are wound up in face to face contact with each other. The marginal flange portions 50a and 51a of the two innermost convolutions are then folded inwardly toward the bead portion 5. A third convolution 52 is then wound in face to face contact with convolution 51. One end of a strip of asbestos or other non-metallic packing 11 of suitable length and dimensions is then wound about convolution 52 and then the next convolution 53 is wound over the asbestos strip. Suitable pressure is applied to the combined convolutions so as to consolidate the metal strip and asbestos into locking engagement. The marginal flange portions 52a of convolution 52 are then folded at substantially right angles to portions 52b to form an L-shaped cross-sectional contour so that the free edge portions 52c contact or abut the next succeeding convolution. A suitable number of further convolutions of the strip 10 are then formed, the marginal flange portions 7c and 8c thereof also being folded at substantially right angles to portions 7a and 8a respectively so that the free edge portions 7d and 8d contact or abut the next succeeding convolution as shown in Figure 3. The two outermost convolutions 30 and 31 are then formed without any packing therebetween and their lateral flange portions 7c and 8c folded over and locked in the pocket portions 6.

This construction provides a gasket the lateral faces of which are completely jacketed or closed by means of the folded flange portions of the metal strip. The asbestos or other packing is thus fully protected against contact with oil, water or other deleterious substances.

Changes and modifications may be made in the specific embodiments of the gasket construction herein disclosed without departing from the spirit of the invention and it is intended to include such modifications within the scope of the appended claims.

I claim:

1. A gasket having its lateral faces completely metal jacketed comprising a metal strip spirally wound and a non-metallic packing strip interposed between the convolutions, said metal strip having a bead portion extending longitudinally at the medial region thereof, reentrant continuously extending pocket portions at the base of each side of said bead portion, the two outer and inner metal convolutions of said metal strip being in face contact with no non-metallic packing interposed therebetween, said outer and inner convolutions being fixedly locked together and the marginal flanges thereof folded toward said bead portions to provide four-ply flanges and the free edges of said flanges being retained in said pocket portions, and the marginal flanges of the metal strip intermediate said two outermost and innermost convolutions being bent in substantially L-shaped contour and the free edges thereof abutting the next succeeding convolution whereby the lateral faces of said gasket are completely closed and metal jacketed.

2. A gasket having its lateral faces completely metal jacketed comprising a steel strip spirally wound and an asbestos packing strip interposed between the convolutions, said steel strip having a bead portion extending longitudinally at the medial region thereof, reentrant continuously extending pocket portions at the base of each side of said bead portion, the two outer and inner convolutions of said steel strip being in face contact with no packing interposed therebetween, said outer and inner convolutions being fixedly locked together and the marginal flanges thereof folded toward said bead portions to provide four-ply flanges and the free edges of said flanges being retained in said pocket portions, and the marginal flanges of the steel strip intermediate said two outermost and innermost convolutions being bent in substantially L-shaped contour and the free edges thereof abutting the next succeeding convolution whereby the lateral faces of said gasket are completely closed and metal jacketed.

3. A gasket having its lateral faces completely metal jacketed comprising a metal strip spirally wound and a non-metallic packing strip interposed between the convolutions, said metal strip having a bead portion extending longitudinally at the medial region thereof, reentrant continuously extending pocket portions at the base of each side of said bead portion, the two outer and inner metal convolutions of said metal strip being in face contact with no non-metallic packing interposed therebetween, said outer and inner convolutions being fixedly locked together and the marginal flanges thereof folded toward said bead portions to provide four-ply flanges and the free edges of said flanges being retained in said pocket portions, a third innermost metal convolution of said metal strip in face contact with the said innermost convolution with non-metallic packing interposed therebetween, the flanges of said third innermost convolution and of the succeeding convolutions intermediate said outermost and innermost convolutions being bent in substantially L-shaped cross-sectional contour and the free edges thereof abutting the next succeeding convolution whereby the lateral faces of said jacket are completely closed and metal jacketed.

4. A gasket having its lateral faces completely metal jacketed formed of a strip of steel spirally wound with non-metallic packing interposed between convolutions thereof, said metal strip having a bead portion extending longitudinally at the medial region thereof, reentrant continuously extending pocket portions at the base on each side of said bead portion, and lateral flange portions extending from said pocket portions, said flange portions being bent in substantially L-shaped cross-sectional contour, the free edges of said flange portions abutting the next succeeding convolution whereby the lateral faces of said gasket are completely closed and metal jacketed.

ARTHUR G. DAVIS.